(12) United States Patent
Ono et al.

(10) Patent No.: US 11,579,347 B2
(45) Date of Patent: Feb. 14, 2023

(54) SEMICONDUCTOR PARTICLES, DISPERSION, FILM, OPTICAL FILTER, BUILDING MEMBER, AND RADIANT COOLING DEVICE

(71) Applicant: FUJIFILM CORPORATION, Tokyo (JP)

(72) Inventors: Masashi Ono, Kanagawa (JP); Hideki Yasuda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 285 days.

(21) Appl. No.: 16/575,411

(22) Filed: Sep. 19, 2019

(65) Prior Publication Data

US 2020/0012024 A1 Jan. 9, 2020

Related U.S. Application Data

(63) Continuation of application No. PCT/JP2018/008176, filed on Mar. 2, 2018.

(30) Foreign Application Priority Data

Mar. 21, 2017 (JP) .............................. JP2017-054587

(51) Int. Cl.
*G02B 5/20* (2006.01)
*C01B 25/08* (2006.01)
(Continued)

(52) U.S. Cl.
CPC ............ *G02B 5/208* (2013.01); *C01B 25/087* (2013.01); *C01B 33/02* (2013.01); *C08K 3/32* (2013.01);
(Continued)

(58) Field of Classification Search
CPC ........ G02B 5/208; G02B 5/207; G02B 5/206; G02B 5/008; C01B 25/087; C01B 33/02;
(Continued)

(56) References Cited

U.S. PATENT DOCUMENTS

2008/0182391 A1 7/2008 Kahen
2016/0115378 A1 4/2016 Ezure

FOREIGN PATENT DOCUMENTS

| CN | 105264042 A | 1/2016 |
|---|---|---|
| JP | 2010-517291 A | 5/2010 |
| WO | 2017017238 A1 | 2/2017 |

OTHER PUBLICATIONS

English language translation of the following: Office action dated May 11, 2021 from the SIPO in a Chinese patent application No. 201880019481.7 corresponding to the instant patent application.
(Continued)

*Primary Examiner* — Andrew J. Oyer
(74) *Attorney, Agent, or Firm* — Solaris Intellectual Property Group, PLLC

(57) ABSTRACT

Provided are semiconductor particles including a Group 12-16 semiconductor including a Group 12 element and a Group 16 element, a Group 13-15 semiconductor including a Group 13 element and a Group 15 element, or a Group 14 semiconductor including a Group 14 element, the semiconductor particles having a plasma frequency of $1.7 \times 10^{14}$ rad/s to $4.7 \times 10^{14}$ rad/s and a maximum length of 1 nm to 2,000 nm; and a dispersion, a film, an optical filter, a building member, or a radiant cooling device, in all of which the semiconductor particles are used.

17 Claims, 3 Drawing Sheets

(51) Int. Cl.
| | |
|---|---|
| *C01B 33/02* | (2006.01) |
| *C09C 1/00* | (2006.01) |
| *C09C 1/28* | (2006.01) |
| *C08K 3/34* | (2006.01) |
| *C08K 3/32* | (2006.01) |

(52) U.S. Cl.
CPC ............... *C08K 3/34* (2013.01); *C09C 1/00* (2013.01); *C09C 1/28* (2013.01); *G02B 5/207* (2013.01); *C01P 2002/54* (2013.01); *C01P 2004/64* (2013.01); *C01P 2006/40* (2013.01); *C01P 2006/60* (2013.01); *C08K 2201/001* (2013.01); *C08K 2201/011* (2013.01)

(58) Field of Classification Search
CPC .... C09C 1/00; C09C 1/28; C08K 3/34; C08K 3/32; C08K 2201/001; C08K 2201/011; C08K 9/04; C01P 2006/40; C01P 2006/60; C01P 2002/54; C01P 2004/64; C01P 2004/61; C01P 2004/62; C01P 2002/52
See application file for complete search history.

(56) References Cited

OTHER PUBLICATIONS

Kanehara, Masayuki et al., "Indium Tin Oxide Nanoparticles with Compositionally Tunable Surface Plasmon Resonance Frequencies in the Near-IR Region," Journal of American Chemistry Society, 2009, vol. 131, 17736-17740.

A. R. Gentle et al.. "Radiative Heat Pumping from the Earth Using Surface Phonon Resonant Nanoparticles," Nanoletters, American Chem. Soc., 2010, vol. 10 373-379.

Law, S. et al., "Mid-infrared designer metals," Optics Express, May 2012, vol. 20, No. 11, p. 12155-12165I.

Aryaee Panah, M. E. et al., "Highly doped InP as a low loss plasmonic material for mid-IR region," Optics Express, Dec. 2016, vol. 24, No. 25, p. 29077-29088.

International Search Report issued in International Application No. PCT/JP2018/008176 dated Jun. 5, 2018.

Written Opinion of the ISA issued in International Application No. PCT/JP2018/008176 dated Jun. 5, 2018.

Office Action dated Dec. 10, 2019, issued by the JPO in corresponding Japanese Patent Application No. 2019-507500.

Law, S. et al., "Mid-infrared designer metals", Optics Express, vol. 20, No. 11, May 14, 2012, p. 12155-12165.

Aryaee Panah, M.E. et al., "Highly doped InP as a low loss plasmonic material for mid-IR region", Optics Express, vol. 24, No. 25, Dec. 8, 2016, p. 29077-29088.

English language translation of the following: Office action dated Jul. 7, 2020 from the JPO in a Japanese patent application No. 2019-507500 corresponding to the instant patent application.

English language translation of the following: Office action dated Nov. 25, 2020 from the SIPO in a Chinese patent application No. 201880019481.7 corresponding to the instant patent application. This office action translation is submitted now in order to supplement the understanding of the cited references which are being disclosed in the instant Information Disclosure Statement.

English language translation of the following: Office action dated Feb. 16, 2021 from the JPO in a Japanese patent application No. 2019-507500 corresponding to the instant patent application.

English language translation of the following: Notification of Decision of Refusal dated Nov. 1, 2021 from the SIPO in a Chinese patent application No. 201880019481.7 corresponding to the instant patent application.

SEMICONDUCTOR PARTICLES, DISPERSION, FILM, OPTICAL FILTER, BUILDING MEMBER, AND RADIANT COOLING DEVICE

CROSS-REFERENCE TO RELATED APPLICATIONS

This application is a continuation of International Application No. PCT/JP2018/008176, filed Mar. 2, 2018, which claims priority from Japanese Patent Application No. 2017-054587, filed Mar. 21, 2017. The above applications are hereby expressly incorporated by reference, in their entireties, into the present specification.

BACKGROUND OF THE INVENTION

1. Field of the Invention

The present disclosure relates to semiconductor particles, a dispersion, a film, an optical filter, a building member, and a radiant cooling device.

2. Description of the Related Art

Investigations have been conducted on the production of materials that selectively absorb (selective absorption) or reflect (selective reflection) infrared light in the far-infrared region (wavelength of 5 μm to 15 μm).

For example, in Kanehara M, Koike H, Yoshinaga T, and Teranishi T. Indium Tin Oxide Nanoparticles with Compositionally Tunable Surface Plasmon Resonance Frequencies in the Near-IR Region, Journal of American Chemistry Society, Vol. 131, 17736-17740, 2009, a material that uses ITO (indium tin oxide) nanoparticles and thereby selectively absorbs near-infrared light having a wavelength of 1 μm or more and less than 2 μm is described.

Furthermore, in A. R. Gentle and G. B. Smith. Radiative Heat Pumping from the Earth Using Surface Phonon Resonant Nanoparticles, Nanoletters, vol. 10, 373-379, 2010, a material that uses any one or both of $SiO_2$ nanoparticles and SiC nanoparticles and selectively absorbs infrared light in the far-infrared region is described.

SUMMARY OF THE INVENTION

The inventors of the present invention found that in a case in which the ITO nanoparticles described in Kanehara M, et al., JACS, Vol. 131, 17736-17740, 200, are used, near-infrared light can be selectively absorbed; however, absorption of far-infrared light is difficult.

The present inventors also found that in a case in which either or both of the $SiO_2$ nanoparticles and the SiC nanoparticles described in A. R. Gentle et al., Nanoletters, Vol. 10, 373-379, 2010, are used, a material that absorbs absorption wavelengths intrinsic to the respective materials is obtained; however, it is difficult to obtain a material that absorbs light having any arbitrary wavelength in the far-infrared light.

An object to be solved by embodiments of the invention is to provide semiconductor particles that enable selective absorption or selective reflection of infrared light having a wavelength in an arbitrarily selected range in the far-infrared region, and a dispersion, a film, an optical filter, a building member, or a radiant cooling device, in all of which the above-described semiconductor particles are used.

Means for solving the problems described above include the following embodiments.

<1> A semiconductor particle comprising a Group 12-16 semiconductor containing a Group 12 element and a Group 16 element, a Group 13-15 semiconductor containing a Group 13 element and a Group 15 element, or a Group 14 semiconductor containing a Group 14 element, the semiconductor particle having a plasma frequency of $1.7 \times 10^{14}$ rad/s to $4.7 \times 10^{14}$ rad/s and a maximum length of 1 nm to 2,000 nm.

<2> The semiconductor particle according to <1>, wherein the semiconductor particle has a ligand on a surface thereof.

<3> The semiconductor particle according to <1> or <2>, wherein the semiconductor particle has a plasma frequency of $1.9 \times 10^{14}$ rad/s to $3.0 \times 10^{14}$ rad/s.

<4> The semiconductor particle according to any one of <1> to <3>, wherein the semiconductor particle comprises a Group 13-15 semiconductor.

<5> The semiconductor particle according to <4>, wherein the semiconductor particle comprises at least one semiconductor selected from the group consisting of InP, InGaP, GaN, InGaN, InAs, InSb, and GaAs.

<6> The semiconductor particle according to <4> or <5>, wherein the semiconductor particle comprises InP.

<7> The semiconductor particle according to any one of <1> to <6>, wherein the semiconductor particle has a carrier concentration of $6.5 \times 10^{18}$ cm$^{-3}$ to $5 \times 10^{19}$ cm$^{-3}$.

<8> The semiconductor particle according to <7>, wherein the semiconductor particle has a carrier concentration of $8 \times 10^{18}$ cm$^{-3}$ to $2 \times 10^{19}$ cm$^{-3}$.

<9> The semiconductor particle according to any one of <1> to <8>, further including a dopant.

<10> The semiconductor particle according to <9>, wherein the dopant comprises at least one selected from the group consisting of Sn, C, Si, S, Se, Te, Mg, and Zn.

<11> The semiconductor particle according to <9> or <10>, wherein the dopant is Sn.

<12> The semiconductor particle according to any one of <1> to <11>, wherein the semiconductor particle has a maximum length of 1 nm to 1,000 nm.

<13> The semiconductor particle according to any one of <1> to <12>, wherein the semiconductor particle has a maximum length of 5 nm to 100 nm.

<14> The semiconductor particle according to any one of <1> to <13>, wherein the semiconductor particle has a shell layer.

<15> The semiconductor particle according to any one of <1> to <14>, wherein the semiconductor particle has a minimum transmission wavelength in a wavelength range of 5 μm to 15 μm.

<16> The semiconductor particle according to any one of <1> to <15>, wherein the semiconductor particle is used for forming a far-infrared absorbing material.

<17> The semiconductor particle according to any one of <1> to <15>, wherein the semiconductor particle is used for forming a far-infrared reflecting material.

<18> A dispersion comprising the semiconductor particle according to any one of <1> to <17>; and a medium.

<19> A film comprising the semiconductor particle according to any one of <1> to <17>.

<20> An optical filter comprising the semiconductor particle according to any one of <1> to <17>.

<21> A building member comprising the semiconductor particle according to any one of <1> to <17>.

<22> A radiant cooling device comprising the semiconductor particle according to any one of <1> to <17>.

According to the embodiments of the invention, semiconductor particles that enable selective absorption or selective reflection of infrared light having a wavelength in an arbitrarily selected range in the far-infrared region, and a dispersion, a film, an optical filter, a building member, or a radiant cooling device, in all of which the semiconductor particles are used, can be provided.

DESCRIPTION OF THE PREFERRED EMBODIMENTS

Figure 1:
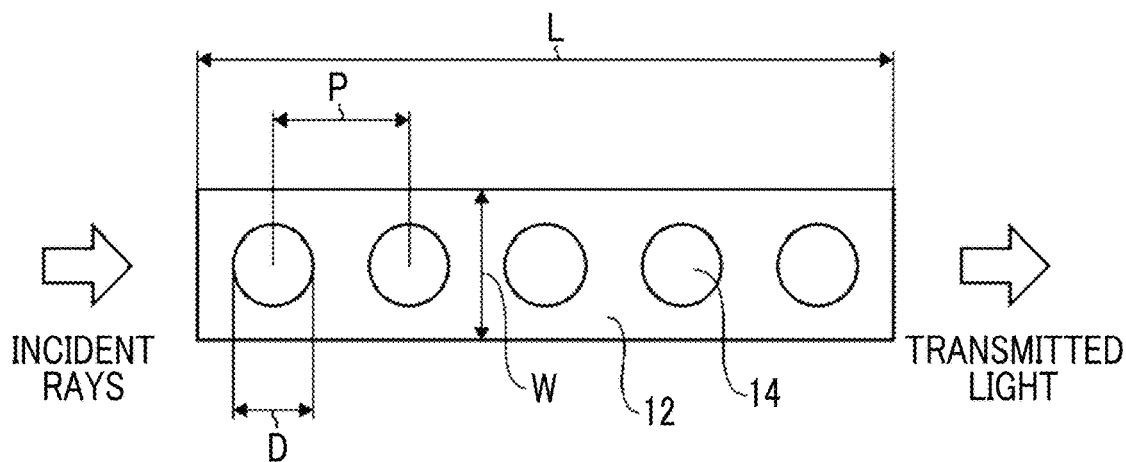
FIG. 1 is a schematic diagram illustrating a structure used in a simulation according to the FDTD method.

In the following description, the contents of the present disclosure will be explained in detail. The explanation of constituent requirements that will be described below may be based on a representative embodiment of the present disclosure; however, the present disclosure is not intended to be limited to such an embodiment.

Meanwhile, in the present specification, the symbol "~" indicating a value range is used to mean that the values described before and after the symbol are included as the lower limit and the upper limit, respectively.

Regarding the term "process" as used in the present specification, an independent process as well as a process that cannot be clearly distinguished from another process is also included in the present term as long as the predetermined purpose of the process is achieved.

According to the present specification, a combination of preferred embodiments represents a more preferred embodiment.

(Semiconductor Particles)

Semiconductor particles according to the present disclosure comprise a Group 12-16 semiconductor containing a Group 12 element and a Group 16 element, a Group 13-15 semiconductor containing a Group 13 element and a Group 15 element, or a Group 14 semiconductor containing a Group 14 element, and have a plasma frequency of $1.7 \times 10^{14}$ rad/s to $4.7 \times 10^{14}$ rad/s and a maximum length of 1 nm to 2,000 nm.

The semiconductor particles according to the present disclosure are suitably used for forming a far-infrared absorbing material or for forming a far-infrared reflecting material.

As described above, with regard to conventional materials that absorb infrared light, it has been difficult to implement selective absorption or selective reflection of infrared light having a wavelength in an arbitrarily selected range in the far-infrared region.

Thus, the inventors of the present invention conducted a thorough investigation, and as a result, the inventors found that selective absorption or selective reflection of infrared light having a wavelength in an arbitrarily selected range in the far-infrared region can be implemented using the semiconductor particles according to the present disclosure.

In regard to the semiconductor particles according to the present disclosure, it is speculated that selective absorption or selective reflection in the far-infrared region is based on plasmon resonance.

The wavelength at which plasmon resonance occurs is correlated with the plasma frequency. The plasma frequency co, is a value determined by the free electron density (carrier concentration) of a material, and is calculated by the following Formula A.

$$\omega_p = \sqrt{\frac{Ne^2}{\varepsilon_0 \varepsilon_\infty m_e^*}} \quad \text{Formula A}$$

Here, N represents the carrier concentration; e represents the elementary charge of an electron; $\varepsilon_0$ represents the electron permittivity of free space; $\varepsilon_\infty$ represents the electron permittivity of a semiconductor material at infinite frequency; and $m_e^*$ represents an effective mass of an electron in a semiconductor material. Here, values known in the literature for bulk materials are used for the various parameters.

Here, the present inventors found that resonance can be realized at any arbitrary wavelength in the far-infrared region by controlling the plasma frequency of semiconductor particles to be between $1.7 \times 10^{14}$ rad/s and $4.7 \times 10^{14}$ rad/s.

In order to realize strong selective absorption or selective reflection induced by plasmon resonance, it is considered important that the plasma collision frequency of a material is sufficiently low. That is, it is considered necessary that the carrier mobility of the material is high, and there are fewer scattering factors such as scattering of ionized impurities. According to the present disclosure, strong selective absorption or selective reflection implies that the absorbance or reflectance at a particular wavelength is high.

It is speculated that in a case in which the plasma collision frequency is high, the plasma oscillation of free electrons is inhibited, it is difficult to have sufficient resonance absorption, the absorption coefficient or reflectance of infrared light is also lowered, the band width upon absorption or reflection is also widened, and the selectivity for selective absorption or selective reflection of infrared light is also weakened.

The present inventors found that it is possible to realize strong selective absorption or selective reflection by using a Group 12-16 semiconductor, a Group 13-15 semiconductor, or a Group 14 semiconductor, for all of which crystals of high purity can be easily obtained, and high mobility can be easily realized.

Furthermore, the present inventors found that in a material in a bulk state, plasmon resonance occurs only in the vicinity of the surface of the material; however, by using particles having a maximum length of 1 nm to 2,000 nm, plasmon resonance occurs in almost all of the particles, and strong selective absorption or selective reflection is realized.

In the following description, the components included in the semiconductor particles according to the present disclosure and the characteristics of the semiconductor particles will be explained.

<Semiconductor>

The semiconductor particles according to the present disclosure comprises a Group 12-16 semiconductor containing a Group 12 element and a Group 16 element, a Group 13-15 semiconductor containing a Group 13 element and a Group 15 element, or a Group 14 semiconductor containing a Group 14 element.

Each of the above-described semiconductors may include an additive element. For example, in the case of a Group 12-16 semiconductor, a Group element 12 or a Group 16 element, which is different from the element of the parent material, may be added to the semiconductor, and in the case of a Group 13-15 semiconductor, a Group 13 element or a Group 15 element, which is different from the element of the present material, may be added to the semiconductor. In the case of a Group 14 semiconductor, a Group 14 element that is different from the element of the parent material may be added.

For example, in a case in which the compound semiconductor is InP, Ga or Al may be added as the Group 13 element, or N, As, Sb, Bi, or the like may be added as the Group 15 element.

Regarding such a semiconductor, any known semiconductor can be used without any particular limitations; however, examples thereof include Si, SiGe, InP, GaP, InGaP, AlP, GaN, InGaN, AlN, InN, InSb, GaSb, InAs, GaAs, CdS, CdSe, CdTe, ZnS, ZnSe, ZnSeS, CdZnS, CdZnSe, and CdTe.

Among these, from the viewpoint that crystallinity of the semiconductor is increased, and the plasma collision frequency is easily reduced, the semiconductor is preferably a Group 13-15 semiconductor, and more preferably InP, InGaP, GaN, InGaN, InSb, InAs, or GaAs. Furthermore, from the viewpoint that synthesis of the semiconductor particles is relatively easy, and the decrease in the carrier mobility caused by doping is small, the semiconductor is more desirably InP.

[Control of Carrier Concentration]

In order to control the carrier concentration that will be described below, it is preferable that the semiconductor further includes a dopant, or includes a crystal defect.

Among these, from the viewpoint that crystallinity is maintained, and the carrier mobility can be easily enhanced, it is preferable that the semiconductor further includes a dopant.

Regarding the dopant, any dopant that is known in the field of semiconductor can be used without any particular limitations.

For example, the dopant is not particularly limited; however, it is preferable that the dopant is at least one selected from the group consisting of Sn, C, Si, S, Se, Te, Mg, and Zn.

Sn, C, Si, S, Se, and Te are n-dopants for a Group 13-15 semiconductor, and Zn and Mg are p-dopants for a Group 13-15 semiconductor.

Among these, particularly from the viewpoint that free electrons can be easily released, and mobility is not easily decreased by addition, the dopant is preferably Sn.

The content of the semiconductor is preferably from 20% by mass to 99.8% by mass, more preferably from 30% by mass to 85% by mass, and even more preferably from 40% by mass to 75% by mass, with respect to the total mass of the semiconductor particles. The upper limit of the content of the semiconductor is not particularly limited and may be 100% by mass or less.

<Plasma Frequency>

For the semiconductor particles according to the present disclosure, the plasma frequency that is calculated by Formula A is $1.7 \times 10^{14}$ rad/s to $4.7 \times 10^{14}$ rad/s, and preferably $1.9 \times 10^{14}$ rad/s to $3.0 \times 10^{14}$ rad/s.

In the semiconductor particles according to the present disclosure, the plasma frequency can be adjusted to be in the range described above by adjusting the carrier concentration of the semiconductor.

[Carrier Concentration of Semiconductor]

Quantitative determination of the carrier concentration of the semiconductor is carried out, in a case in which the carrier concentration is relatively low (for example, about $10^{19}$ cm$^{-3}$ or less), by a Time Resolved Microwave Conductivity method (TRMC method) or an ESR (Electron Spin Resonance) method, and in a case in which the carrier concentration is relatively high (for example, about $10^{20}$ cm$^{-3}$ or more), by making the semiconductor into a thin film form and measuring the hole mobility.

According to the present disclosure, the carrier concentration of the semiconductor is preferably $6.5 \times 10^{18}$ cm$^{-3}$ to $5 \times 10^{19}$ cm$^{-3}$, from the viewpoint of realizing selective absorption or selective reflection in the far-infrared region. In a case in which the material is a Group 13-15 semiconductor, it is particularly preferable that the carrier concentration is in the range described above. For example, in a case in which the material is a Group 14 semiconductor, it is desirable that the carrier concentration is $2.6 \times 10^{19}$ cm$^{-3}$ to $2.0 \times 10^{20}$ cm$^{-3}$. Furthermore, from the viewpoint that selective absorption or selective reflection in the wavelength range of 8 μm to 14 μm, where the control of thermal radiation at near room temperature is enabled, is easily realized, it is preferable that the carrier concentration of the semiconductor is $8 \times 10^{18}$ cm$^3$ to $2 \times 10^{19}$ cm$^{-3}$.

It is preferable that the carrier concentration according to the present disclosure has a value that gives $1.9 \times 10^{14}$ rad/s to $3.0 \times 10^{14}$ rad/s in a case in which the carrier concentration is converted to the plasma frequency.

<Maximum Length>

The semiconductor particles according to the present disclosure have a maximum length of 1 nm to 2,000 nm.

From the viewpoint that it is easy to control the selectivity (band width) of the wavelength at which selective absorption or selective reflection of infrared light in the far-infrared region is achieved, the maximum length is preferably 1 nm to 1,000 nm, more preferably 5 nm to 600 nm, even more preferably 5 nm to 400 nm, and particularly preferably 5 nm to 100 nm.

From the viewpoint of selective absorptiveness for infrared light in the far-infrared region, the maximum length is preferably 1 nm to 100 nm, more preferably 5 nm to 100 nm, and even more preferably 5 nm to 50 nm.

From the viewpoint of selective reflectivity for infrared light in the far-infrared region, the maximum length is preferably 100 nm to 2,000 nm, more preferably 100 nm to 1,000 nm, and even more preferably 100 nm to 500 nm.

The maximum length is determined by, for example, observing the particles using a TEM (Transmission Electron Microscope) such as TITAN 80-300 manufactured by FEI Company, and measuring the maximum length as the maximum value of the distance between any arbitrary two points in the range that is included in each particle in a flat image.

<Ligand>

It is preferable that the semiconductor particles according to the present disclosure have a ligand on the surface in order to impart dispersibility to the medium and to reduce defects at the outermost surface. Regarding the ligand, any known surface ligand can be used without any particular limitations, and the ligand may contain an inorganic molecule (element) such as a halogen or a metal ion, or may contain an organic molecule; however, from the viewpoint of dispersibility in a non-polar solvent, it is preferable that the ligand contains an aliphatic hydrocarbon having a coordination part.

The coordination part is a portion by which the ligand is coordinated with the semiconductor, and any structure that is coordinated with the semiconductor can be used without any particular limitations; however, examples thereof include a carboxy group, a group containing a nitrogen atom (an amino group or the like), a group containing a sulfur atom (a thiol group or the like), a hydroxy group, a group containing a phosphorus atom (a phosphate group, a phosphonate group, or the like), an onium group, a halogen element, and a metal element.

Since the semiconductor includes the ligand, for example, in a case in which the semiconductor particles are produced into a dispersion in a solvent, aggregation between the semiconductor particles is suppressed, and the semiconductor particles exhibit superior selective absorption or selective reflection in the far-infrared region.

From the viewpoint of enhancing the dispersibility of the semiconductor particles, the ligand is preferably a ligand having at least 6 or more carbon atoms in the main chain, and more preferably a ligand having 10 or more carbon atoms in the main chain. The upper limit of the number of carbon atoms of the main chain is not particularly limited; however, the upper limit is preferably 30 or fewer.

According to the present disclosure, the term main chain represents a relatively longest linked chain in the molecule of a compound.

Specific examples include decanoic acid, lauric acid, myristic acid, palmitic acid, stearic acid, behenic acid, oleic acid, erucic acid, oleylamine, dodecylamine, dodecanethiol, 1,2-hexadecanediol, trioctylphosphine oxide, and hexadecyltrimethylammonium bromide.

In regard to the semiconductor particles according to the embodiment of the invention, in order to check whether a ligand exists on the surface, for example, a Fourier transform infrared spectrophotometer (FTIR) can be used. For example, in a case in which FTIR is used, whether a surface ligand exists in an object particle can be verified by measuring the presence or absence of stretching vibration originating from a hydrocarbon group near 2,900 to 3,000 $cm^{-1}$.

Regarding the ligand, one kind thereof may be used alone, or two or more kinds thereof may be used in combination.

From the viewpoint of the dispersibility of the semiconductor particles, the content of the ligand is preferably 0.2% by mass to 80% by mass, more preferably 15% by mass to 70% by mass, and even more preferably 25% by mass to 60% by mass, with respect to the total mass of the semiconductor particles.

<Shell Layer>

In order to impart durability against oxidation or the like to the semiconductor particles, the semiconductor particles may have a core-shell structure including a core particle and a shell layer.

The material for the shell layer is not particularly limited; however, in order to reduce surface defects of the semiconductor particles and to easily realize high mobility, it is preferable that the material is a crystalline material that is identical or similar to the material of the core particle.

For example, in a case in which the core particle has a sphalerite type structure, it is preferable that the shell layer is also formed from a sphalerite type material. Furthermore, since particles having fewer defects can be realized in a case in which the difference between the lattice constants of the core particles and the shell layer is smaller, it is desirable that the lattice mismatch between the core particle and the shell layer is 10% or less. From the viewpoint that it is easier to obtain particles having fewer defects, the lattice mismatch is preferably 4% or less, and it is more desirable that the lattice mismatch is 2% or less.

The lattice mismatch (%) is a value calculated by the following formula: |lattice constant of core layer−lattice constant of shell layer|/lattice constant of core layer×100.

Particularly, in a case in which the core particle is formed from InP, it is preferable that the shell layer includes GaP, ZnSe, ZnS, or ZnSeS, and it is more preferable that the shell layer includes ZnS that has low biological toxicity is likely to form a shell with fewer defects.

In a case in which the shell layer is formed from a Group 12-16 semiconductor, a Group 13 element or a Group 15 element may be included at any arbitrary proportion, and in the case of a Group 13-15 semiconductor, a Group 12 element or a Group 16 element may be included at any arbitrary proportion.

The semiconductor particles according to the present disclosure may have a multi-shell structure having a plurality of shell layers. The materials of the multiple shell layers may be identical with each one another or may be different from one another.

<Maximum Absorption Wavelength>

It is preferable that the semiconductor particles according to the present disclosure have a minimum transmission wavelength at the transmittance in the wavelength range of 5 μm to 15 μm, and from the viewpoint of implementing control of thermal radiation at near room temperature, it is more preferable that the semiconductor particles have a minimum transmission wavelength at the transmittance in the wavelength range of 8 μm to 14 μm.

The transmittance is obtained by loading approximately 2 mg of the semiconductor particles according to the present disclosure on a double side-polished silicon substrate that measures 1 cm on each side in a glove box, drying the semiconductor particles therein, and making a measurement using FTIR.

The transmittance at the minimum transmission wavelength is preferably 0.8 or lower, and more preferably 0.7 or lower. The lower limit of the transmittance is not particularly limited and may be 0 or higher.

<Shape of Semiconductor Particles>

The shape of the semiconductor particles according to the present disclosure is not particularly limited, and examples of the shape include a spherical shape, a flaky shape, and a rod shape.

It is also acceptable that about two to ten particles bind together and form a secondary particle.

<Method for Producing Semiconductor Particles>

The semiconductor particles according to the present disclosure may be produced by a known method.

As an embodiment of the method for producing semiconductor particles according to the present disclosure, an embodiment including a step of adding a raw material including a Group 12 element or a Group 13 element and a raw material including an element that serves as a dopant and heating and stirring the mixture (first heating and stirring step); a step of further adding a raw material including a Group 16 element or a Group 15 element thereto and forming particles (second heating and stirring step); and a step of heating and stirring the particles thus formed and growing the particles (growing step), may be mentioned.

By using the production method described above, a Group 12-16 semiconductor or a Group 13-15 semiconductor is obtained.

A Group 14 semiconductor is obtained by using a raw material including a Group 14 element instead of a raw material including a Group 12 element or a Group 13 element in the first heating and stirring step, and forming particles without adding a raw material including a Group 16 element or a Group 15 element in the second heating step.

[First Heating and Stirring Step]

The heating and stirring method for the first heating and stirring step is not particularly limited, and any known method is used. The heating temperature may be set as appropriate according to the material; however, for example, the heating temperature is preferably 100° C. to 300° C.

In a case in which semiconductor particles having a ligand on the surface are produced, the ligand may be further added in the present step.

In order to suppress oxidation of the raw materials and to make it easy to obtain highly crystalline particles, it is preferable to carry out the heating and stirring in the first heating and stirring step in a vacuum, or in an inert atmosphere such as under a nitrogen gas stream. It is also preferable that steps after this step are all carried out in an inert atmosphere.

[Second Heating and Stirring Step]

Regarding the heating and stirring method for the second heating and stirring step, any known method is used without particular limitations.

The heating temperature may be set as appropriate according to the materials; however, in order to obtain highly crystalline particles, it is preferable to set the heating temperature to be 200° C. or higher. The upper limit of the heating temperature is not particularly limited, and for example, the upper limit may be 500° C. or lower.

In the case of producing semiconductor particles having a ligand on the surface, the ligand may be further added in the present step.

[Growing Step]

Regarding the heating and stirring method for the growing step, any known method is used without particular limitations.

The heating temperature is not particularly limited; however, it is preferable to set the heating temperature to be 150° C. to 350° C.

The heating and stirring time is not particularly limited; however, it is preferable to set the time to be from 10 minutes to 10 hours. It is possible to adjust the maximum length of the semiconductor particles thus obtainable, by setting the heating and stirring time as appropriate.

In the case of producing semiconductor particles having a ligand on the surface, the ligand may be further added in the present step.

[Other Steps]

The method for producing semiconductor particles according to the present disclosure may include other steps. Examples of the other steps include a step of forming a shell layer, a step of cooling the particles obtained in the growing step, and a step of separating the particles obtained by centrifugation or the like.

(Dispersion)

A dispersion according to the present disclosure includes the semiconductor particles according to the present disclosure; and a medium.

By using the dispersion according to the present disclosure, it is possible to produce a film, an optical filter, a building member, a radiant cooling apparatus, or the like.

<Semiconductor Particles>

The dispersion according to the present disclosure may include one kind of the semiconductor particles according to the present disclosure alone, or may include two or more kinds thereof in combination.

For example, in order to broaden the selectivity (band width) of the wavelength at which selective absorption or selective reflection occurs in the far-infrared region, an embodiment including two or more kinds of particles having different plasma frequencies may be used. The dispersion of the above-described embodiment is suitably used in, for example, a radiant cooling device, and an optical filter.

[Content of Semiconductor Particles]

The content of the semiconductor particles in the dispersion according to the present disclosure may be set as appropriate according to the use of the dispersion; however, the content is preferably 0.1% by mass to 50% by mass, and more preferably 0.5% by mass to 30% by mass, with respect to the total mass of the dispersion.

[Average Maximum Length of Semiconductor Particles]

The average maximum length of the semiconductor particles included in the dispersion according to the present disclosure is preferably 1 nm to 2,000 nm.

From the viewpoint that it is easy to control the selectivity (band width) of the wavelength at which selective absorption or selective reflection of infrared light in the far-infrared region occurs, the average maximum length is preferably 1 nm to 1,000 nm, more preferably 5 nm to 600 nm, even more preferably 5 nm to 400 nm, and particularly preferably 5 nm to 100 nm.

From the viewpoint of selective absorptiveness for infrared light in the far-infrared region, the average maximum length is preferably 1 nm to 100 nm, more preferably 5 nm to 100 nm, and even more preferably 5 nm to 50 nm.

From the viewpoint of selective reflectivity for infrared light in the far-infrared region, the average maximum length is preferably 100 nm to 2,000 nm, more preferably 100 nm to 1,000 nm, and even more preferably 100 nm to 500 nm.

The average maximum length is calculated as an arithmetic mean value of the maximum lengths of one hundred particles, which are obtained by, for example, observing the particles using a TEM (Transmission Electron Microscope) such as TITAN 80-300 manufactured by FEI Company, and measuring the maximum length as the maximum value of the distance between any arbitrary two points on each particle in a flat image.

<Medium>

The medium is not particularly limited; however, it is desirable to use, for example, an organic solvent, or a monomer such as a compound having an epoxy group, an acrylic compound, or a vinyl compound. Specifically, an aromatic hydrocarbon such as toluene; a halogenated alkyl such as chloroform; an aliphatic saturated hydrocarbon such as hexane, octane, n-decane, n-dodecane, n-hexadecane, or n-octadecane; an aliphatic unsaturated hydrocarbon such as 1-undecene, 1-dodecene, 1-hexadecene, or 1-octadecene; trioctylphosphine, trioctylphosphine oxide, an acrylic acid ester compound, or the like can be used.

Regarding the medium, one kind thereof may be used alone, or two or more kinds thereof may be used as mixtures.

The medium is preferably a non-polar solvent.

Regarding the medium, from the viewpoint that the medium is not likely to remain at the time of producing a film, an optical filter, a building member, a radiant cooling device, or the like, a medium having a boiling point of 200° C. or lower is preferred, and a medium having a boiling point of 100° C. or lower is more preferred.

<Other Components>

The dispersion according to the present disclosure may include other components.

The other components may be known additives.

<Method for Producing Dispersion>

Regarding the method for producing the dispersion according to the present disclosure, it is preferable that the method includes a step of dispersing the semiconductor particles according to the present disclosure in a medium.

The dispersing method is not particularly limited, and for example, known methods such as ultrasonic dispersion, a roll mill, a ball mill, a vibratory ball mill, an attriter, a sand mill, a colloid mill, and a paint shaker may be mentioned.

(Film)

A film according to the present disclosure includes the semiconductor particles according to the present disclosure.

By attaching such a film to, for example, windowpanes of a building, a construction, or a car, it becomes possible to cut off particular far-infrared light or to decrease the temperature of an object by radiant cooling, and the use of electric power required for cooling can be reduced.

It is preferable that the film according to the present disclosure is, for example, a film including a base material and the semiconductor particles according to the present disclosure. The semiconductor particles according to the present disclosure may be incorporated in the base material, or a layer including the semiconductor particles according to the present disclosure may be formed on the base material.

<Base Material>

Regarding the base material, any base material that is known as a film material can be used without any particular limitations, and the base material may be, for example, a resin or thin glass. Specific examples include materials based on an acrylic resin, an ionomer resin, a polyolefin (polyethylene, polypropylene, or the like), polyvinyl chloride, polyvinylidene chloride, polyvinyl alcohol, a polyester, a polycarbonate, polystyrene, polyacrylonitrile, an ethylene-vinyl acetate copolymer, an ethylene-vinyl alcohol copolymer, an ethylene-methacrylic acid copolymer film, and nylon.

From the viewpoint that an effect of enabling selective absorption or selective reflection of infrared light in an arbitrarily selected wavelength range in the far-infrared region by means of the semiconductor particles according to the present disclosure, is easily obtainable, it is preferable to use a resin that has low absorption in the far-infrared region as the base material. Specifically, a polyolefin (polyethylene, polypropylene, or the like) is preferred.

There are no particular limitations on the size or form of the base material, and the size or form may be set as appropriate according to the usage.

The thickness of the base material is not particularly limited; however, the thickness is preferably 50 μm to 1,000 μm, and more preferably 50 μm to 500 μm.

<Semiconductor Particles>

The film according to the present disclosure may include one kind of the semiconductor particles according to the present disclosure alone, or may include two or more kinds thereof in combination.

[Content of Semiconductor Particles]

The content of the semiconductor particles in the film according to the present disclosure may be set as appropriate according to the usage of the dispersion; however, the content is preferably 0.5% by volume to 80% by volume, and more preferably 1.0% by volume to 50% by volume, with respect to the total volume of the dispersion.

[Average Maximum Length of Semiconductor Particles]

A preferred embodiment of the average maximum length of the semiconductor particles included in the film according to the present disclosure is similar to the above-described preferred embodiment of the average maximum length in the dispersion.

The average maximum length of the semiconductor particles in the film according to the present disclosure is determined by observing the film using a TEM, and calculating the average maximum length by a method similar to the method for measuring the average maximum length for the dispersion.

<Other Layers>

The film according to the present disclosure may have other layers.

Examples of the other layers include a reflective layer that reflects light in at least some region other than the far-infrared region (for example, a reflective layer that reflects visible light, or a reflective layer that reflects near-infrared light), and functional layers that are known in the field of films.

(Optical Filter)

The optical filter according to the present disclosure is an optical filter containing the semiconductor particles according to the present disclosure.

It is suitable to use the optical filter according to the present disclosure as, for example, a part of a lens module for a far-infrared camera (a surveillance camera or thermography) or the like, and the sensitivity of a camera can be increased by cutting off noise light in a particular wavelength region or by increasing the absorption capacity for a particular wavelength.

The optical filter according to the present disclosure is preferably, for example, a filter including a base material and semiconductor particles. The semiconductor particles according to the present disclosure may be incorporated in the base material, or a layer including the semiconductor particles according to the present disclosure may be formed on the base material.

<Base Material>

Regarding the base material, any base material that is known as a material for optical filters can be used without any particular limitations, and for example, the base material may be a resin or may be thin glass. Specifically, glass and the resins mentioned above with regard to the base material for the film material may be used.

There are no particular limitations on the size or form of the base material, and the size or form may be set as appropriate according to the usage.

The thickness of the base material is not particularly limited; however, the thickness is preferably 50 μm to 1,000 μm, and more preferably 50 μm to 500 μm.

<Semiconductor Particles>

An optical filter according to the present disclosure may include one kind of the semiconductor particles according to the present disclosure alone, or may include two or more kinds thereof in combination.

[Content of Semiconductor Particles, Average Maximum Length of Semiconductor Particles]

Preferred embodiments of the content of the semiconductor particles and the average maximum length of the semiconductor particles for the optical filter according to the present disclosure are similar to the above-described preferred embodiments of the content of the semiconductor particles and the average maximum length of the semiconductor particles for the film according to the present disclosure.

<Other Layers>

The optical filter according to the present disclosure may have other layers.

Examples of the other layers include a reflective layer that reflects light in at least some region other than the far-infrared region (for example, a reflective layer that reflects visible light, and a reflective layer that reflects near-infrared light), and functional layers that are known in the field of optical filters.

(Building Member)

The building member according to the present disclosure is a building member containing the semiconductor particles according to the present disclosure.

For example, by using the particles according to the present disclosure in the roof, walls, and windowpanes of a building, it is made possible to absorb or reflect far-infrared light having a particular wavelength, or to lower the temperature of the object in a non-electrified manner by radiant cooling.

It is preferable that the building member according to the present disclosure is, for example, a building member including a base material and semiconductor particles. The semiconductor particles according to the present disclosure may be incorporated in the base material, or a layer containing the semiconductor particles according to the present disclosure may be formed on the base material.

<Base Material>

As the base material, any known base material that is used for building members can be used without any particular limitations, and examples include resin, glass, metal, wood, and concrete.

<Semiconductor Particles>

The building member according to the present disclosure may include one kind of the semiconductor particles according to the present disclosure alone, or may include two or more kinds thereof in combination.

[Content of Semiconductor Particles, Average Maximum Length of Semiconductor Particles]

Preferred embodiments of the content of the semiconductor particles and the average maximum length of the semiconductor particles for the building member according to the present disclosure are similar to the above-described preferred embodiments of the content of the semiconductor particles and the average maximum length of the semiconductor particles of the film according to the present disclosure.

<Method for Producing Film, Optical Filter, or Building Member>

The film, optical filter, and building member according to the present disclosure may be produced by any known methods without being particularly limited.

Regarding an embodiment of the method for producing a film, an optical filter, or a building member according to the present disclosure, for example, an embodiment including a step of dissolving a base material or the raw material for a base material in the dispersion according to the present disclosure (dissolution step), a step of applying the dispersion on a support (application step), and if necessary, a step of drying the applied dispersion (drying step), may be mentioned.

The film according to the present disclosure, the optical filter according to the present disclosure, or the building member according to the present disclosure is obtained by a step of applying a dispersion having a base material or a raw material of the base material dissolved therein, which has been obtained by a dissolution step, on a support and producing a base material from the raw material of the base material as necessary (base material production step), or a drying step.

Regarding another embodiment of the method for producing the film, optical filter, or building member according to the present disclosure, for example, an embodiment including a step of applying the dispersion according to the present disclosure on a base material (second application step), and a step of drying the dispersion thus applied, as necessary (second drying step), may be mentioned.

[Dissolution Step]

In the dissolution step, a base material or a raw material of the base material is dissolved in the dispersion according to the present disclosure.

At this time, a solvent may be added to the dispersion, a raw material of the base material may be added as a composition including a solvent, or a base material or a raw material of the base material may be mixed, as a solution having a base material or a raw material of the base material dissolved in a solvent, with the dispersion. Preferred solvents include the solvents described above as the medium.

Examples of the base material or the raw material of the base material include the materials or raw materials thereof described as the respective base materials for the film according to the present disclosure, the optical filter according to the present disclosure, or the building member according to the present disclosure, and for example, a resin is preferred.

[Application Step]

The application method for the application step is not particularly limited; however, examples include a spin coating method, a bar coating method, a dip coating method, a spray coating method, an inkjet method, a dispenser method, a screen printing method, a letterpress printing method, and an intaglio printing method.

Regarding the support for the application step, any known support can be used without any particular limitations, and a support that has low solubility in the solvent included in the dispersion and can be easily detached from the film, optical filter, or building member finally obtainable is preferred.

[Base Material Production Step]

In the base material production step, a base material is produced using a dispersion in which a raw material of the base material is dissolved.

For example, a dispersion including a polymerizable compound, a thermal polymerization initiator, and semiconductor particles is used, and by heating this, a film in which semiconductor particles are dispersed in a polymer, or the like can be obtained.

In the base material production step, any method known as a method of forming a base material using a raw material of a base material included in a dispersion can be used without any particular limitations.

For example, in addition to the production of a base material based on thermal polymerization as described above, in a case in which the dispersion includes a polymerizable compound, a photopolymerization initiator, and semiconductor particles as the raw materials of the base material, a method of producing a base material by irradiation with actinic light rays may be mentioned.

[Drying Step]

Drying in the drying step may be natural drying or heated drying.

In the case of performing heated drying, the heating method is not particularly limited, and the heating method can be selected from hot plate heating, electric furnace heating, infrared heating, microwave heating, and the like.

The atmosphere for drying is not particularly limited; however, from the viewpoint of production cost and the like, it is preferable to performing drying in air at atmospheric pressure.

The application step and drying step as described above may be carried out several times repeatedly.

According to the embodiments described above, the thickness of the layer containing the semiconductor particles according to the present disclosure may be easily adjusted to a desired thickness, and the characteristics of the layer thus obtainable can be further enhanced.

[Second Application Step]

The second application step is a step similar to the application step described above, except that application is performed not on a support but on the base material.

[Second Drying Step]

The second drying step is a step similar to the drying step described above.

[Other Steps]

The method for producing the film, optical filter, or building member according to the present disclosure may further include other steps.

Examples of the other steps include a step of forming a reflective layer that reflects light in at least some region other than the far-infrared region described above, or the above-mentioned functional layers.

(Radiant Cooling Device)

A radiant cooling device according to the present disclosure includes the semiconductor particles according to the present disclosure.

Regarding the radiant cooling apparatus, for example, the radiant cooling device described in A. P. Raman et al., "Passive radiative cooling below ambient air temperature under direct sunlight", Nature, Vol. 515, 540, 2014, may be used.

By using the film, optical filter, or the like according to the present disclosure as a wavelength selective radiant layer, a radiant cooling device having a high cooling effect can be realized.

EXAMPLES

Hereinafter, the present disclosure will be described in detail by way of Examples. The materials, amounts of use, proportions, contents of treatment, treatment procedure, and the like disclosed in the following Examples can be modified as appropriate, as long as the gist of the embodiments of the present disclosure is maintained. Therefore, the scope of the embodiments of the present disclosure is not limited to the specific examples shown below. In the present Examples, unless particularly stated otherwise, units "parts" and "percent (%)" mean "parts by mass" and "percent (%) by mass", respectively.

Example 1 to Example 15

<Correlation Between Carrier Concentration and Plasmon Resonance According to FDTD Method>

It was verified using an FDTD method (Finite-difference time-domain method) that plasmon resonance in the band of 5 μm to 15 μm occurs, by using particular semiconductor particles.

FIG. 1 shows the structure used for the simulation. In FIG. 1, reference numeral 12 represents a medium, and reference numeral 14 represents semiconductor particles, while the following parameters were used: L=300 nm, P=50 nm, D=20 nm, and W=30 nm.

Here, the real part n and the imaginary part k of the refractive index of the semiconductor particles were calculated using a Drude model. Furthermore, a periodic boundary condition was assumed in the longitudinal direction.

[InP]

Hereinafter, the simulation results obtained in a case in which InP particles were used as the semiconductor particles will be described. The plasmon frequency was calculated by setting the electron permittivity at infinite frequency, $\varepsilon_\infty$, to 9.61, the effective mass of electrons to 0.075 m0 (m0: mass of free electrons), and the plasma collision frequency to $1.0 \times 10^{13}$ rad/s.

Figure 2:
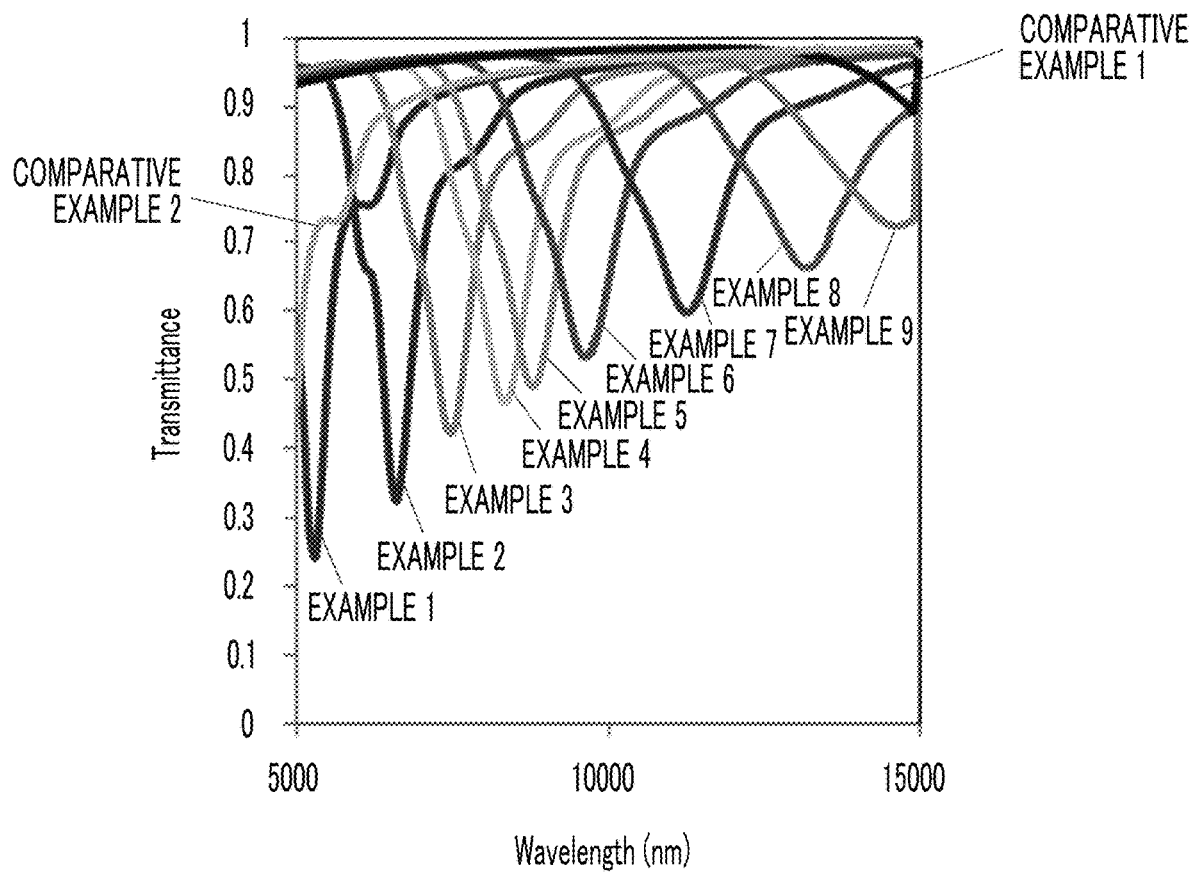
FIG. 2 is a graph showing the results of Example 1 to Example 9 and Comparative Example 1 and Comparative Example 2.

In a case in which the carrier concentration of the semiconductor particles was changed as described in Table 1, the plasmon resonance changed as shown in FIG. 2.

In Table 1, the description in the column for "Plasma frequency" means the plasma frequencies of the respective semiconductor particles, and the values in the column for resonance peak mean the minimum transmission wavelengths at 5 μm to 15 μm of the respective semiconductor particles. The description of 5.0E+19 or the like means $5.0 \times 10^{19}$ or the like.

TABLE 1

|  | Carrier concentration (cm$^{-3}$) | Plasma frequency (rad/s) | Resonance peak (μm) |
| --- | --- | --- | --- |
| Example 1 | 5.0E+19 | 4.7E+14 | 5.3 |
| Example 2 | 3.2E+19 | 3.8E+14 | 6.6 |
| Example 3 | 2.5E+19 | 3.3E+14 | 7.5 |
| Example 4 | 2.0E+19 | 3.0E+14 | 8.3 |
| Example 5 | 1.8E+19 | 2.8E+14 | 8.8 |
| Example 6 | 1.5E+19 | 2.6E+14 | 9.6 |
| Example 7 | 1.1E+19 | 2.2E+14 | 11.1 |
| Example 8 | 8.0E+18 | 1.9E+14 | 13.2 |
| Example 9 | 6.5E+18 | 1.7E+14 | 14.7 |
| Comparative Example 1 | 5.0E+18 | 1.5E+14 | More than 15 μm |
| Comparative Example 2 | 6.0E+19 | 5.1E+14 | Less than 5 μm |

From the results described above, it was found that as the plasma frequency calculated from the carrier concentration is in the range of $1.7 \times 10^{14}$ rad/s to $4.7 \times 10^{14}$ rad/s, selective absorption in the band of 5 μm to 15 μm can be realized.

[Si]

Hereinafter, the simulation results obtained in a case in which Si particles were used as the semiconductor particles will be described. The plasmon frequency was calculated by setting the electron permittivity at infinite frequency, 6, to 11.66, the effective mass of electrons to 0.26 m0 (m0: mass of free electrons), and the plasma collision frequency to $1.0 \times 10^{13}$ rad/s.

Figure 3:
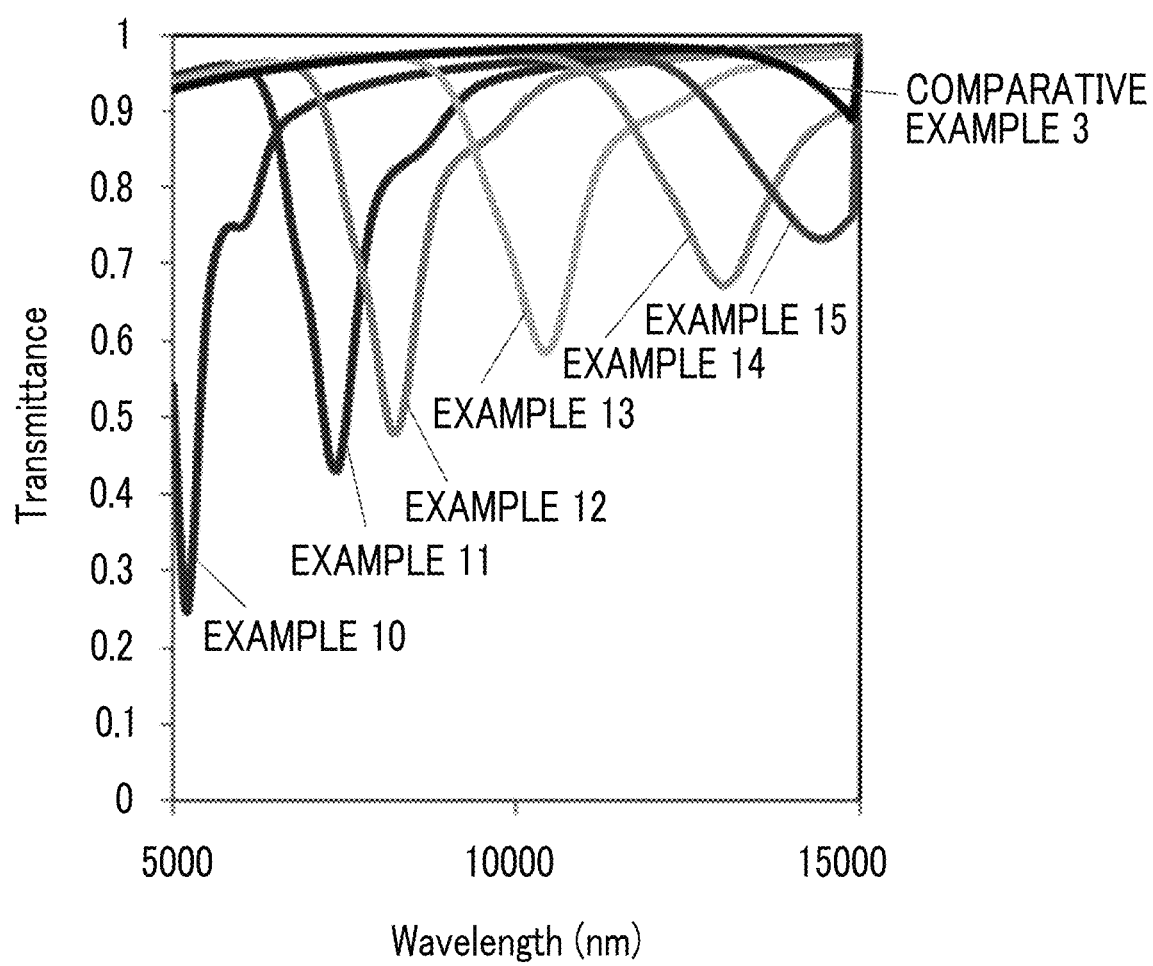
FIG. 3 is a graph showing the results of Example 10 to Example 15 and Comparative Example 3.

In a case in which the carrier concentration of the semiconductor particles was changed as described in Table 2, the plasmon resonance changed as shown in FIG. 3.

In Table 2, the values in the column for resonance peak mean the minimum transmission wavelengths at 5 μm to 15 μm of the respective semiconductor particles. The description of 2.0E+20 or the like means $2.0 \times 10^{20}$ or the like.

TABLE 2

|  | Carrier concentration (cm$^{-3}$) | Plasma frequency (rad/s) | Resonance peak (μm) |
| --- | --- | --- | --- |
| Example 10 | 2.0E+20 | 4.6E+14 | 5.2 |
| Example 11 | 1.0E+20 | 3.2E+14 | 7.4 |
| Example 12 | 8.0E+19 | 2.9E+14 | 8.3 |
| Example 13 | 5.0E+19 | 2.3E+14 | 10.4 |

TABLE 2-continued

| | Carrier concentration (cm$^{-3}$) | Plasma frequency (rad/s) | Resonance peak (μm) |
|---|---|---|---|
| Example 14 | 3.2E+19 | 1.9E+14 | 13 |
| Example 15 | 2.6E+19 | 1.7E+14 | 14.5 |
| Comparative Example 3 | 2.0E+19 | 1.4E+14 | More than 15 μm |

As shown in FIG. 3, it was found that even in a case in which Si particles were used as the semiconductor particles, selective absorption in the range of far-infrared region can be realized by controlling the plasma frequency between $1.7 \times 10^{14}$ rad/s and $4.6 \times 10^{14}$ rad/s.

Example 16

<Plasmon Resonance in Synthetic InP Particles>

30 mL of oleylamine, 1.2 g (5.4 mmol) of indium chloride, and 9.8 μl (30 μmol) of tin 2-ethylhexanoate were introduced into a flask, and the mixture was heated and stirred at 110° C. in a vacuum. Thus, the raw materials were sufficiently dissolved, and also, degassing was carried out.

Next, the temperature of the flask was raised to 220° C. under a nitrogen gas flow, and after the solution temperature had been stabilized, 1.5 mL of trisdimethylaminophosphine (8.27 mmol) was added thereto. Subsequently, the solution was maintained for 180 minutes in a state of being heated to 300° C. The solution was colored red to black, and it was confirmed that particles were formed.

Next, while the state of nitrogen gas flow was maintained, a dispersion liquid thus obtained was cooled to room temperature. A sufficient amount of ethanol was added thereto, and then centrifugation was performed to thereby precipitate particles. The supernatant was discarded, and then the residue was dispersed in toluene solvent. As such, a toluene dispersion liquid (dispersion according to the present disclosure, concentration approximately 1% by mass) of Sn-doped InP particles (semiconductor particles according to the present disclosure) was obtained.

The carrier concentration of the Sn-doped InP particles thus obtained was quantitatively determined by a TRMC method, and the carrier concentration was $1.9 \times 10^{19}$ cm$^{-3}$ (plasma frequency $2.9 \times 10^{14}$ rad/s), the average maximum length was 9.8 nm, while the proportion of semiconductor particles having a maximum length of 1 nm to 2,000 nm among the semiconductor particles included therein was about 100%. An evaluation of the optical characteristics was achieved by dropping 200 μl of a synthesized dispersion liquid on a double side-polished silicon substrate measuring 1 cm on each side in a glove box, drying the dispersion liquid therein, and then making a measurement using FTIR.

The plasmon resonance peak (minimum transmission wavelength in the wavelength region of 5 μm to 15 μm) was 8.5 μm.

The transmittance at the minimum transmission wavelength was approximately 0.50.

Example 17 to Example 22

<Influence of Maximum Length of Semiconductor Particles>

The transmission and reflection spectra obtained in a case in which the maximum length of the semiconductor particles was changed by techniques similar to Examples 1 to 15 were investigated.

The material of the semiconductor particles was set to InP, and the carrier concentration was set to $1.1 \times 10^{19}$ cm$^{-3}$.

The plasmon frequency was calculated by setting the electron permittivity at infinite frequency, 6, to 9.61, the effective mass of electrons to 0.075 m0 (m0: mass of free electrons), and the plasma collision frequency to $1.0 \times 10^{13}$ rad/s.

Figure 4:
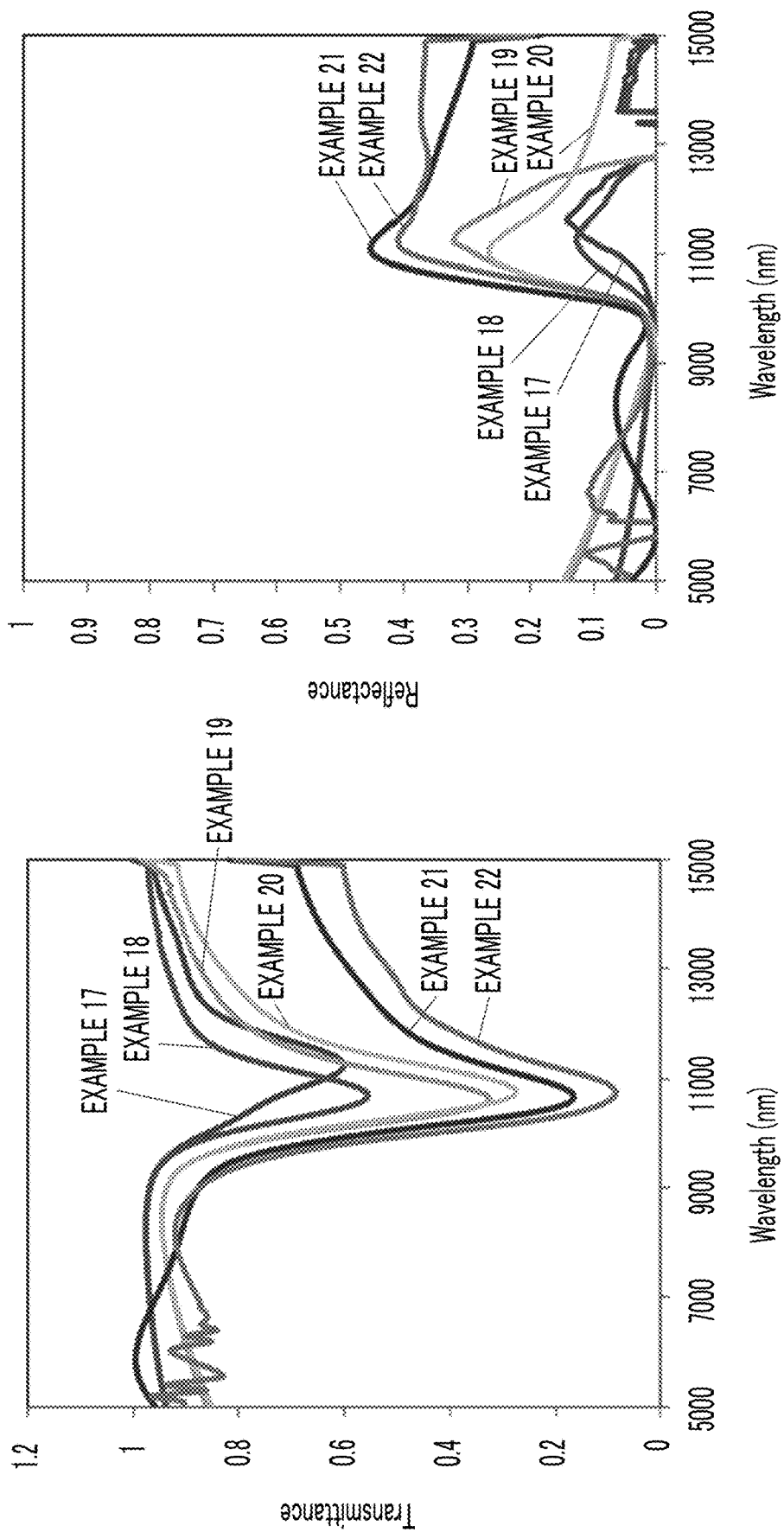
FIG. 4 is a graph showing the results of Example 17 to Example 21.

The evaluation results are described in FIG. 4.

With regard to the various Examples, L, P, D, W, and the number of particles in FIG. 1 were respectively set as described in Table 3.

TABLE 3

| | L (nm) | P (nm) | D (nm) | W (nm) | Number of particles |
|---|---|---|---|---|---|
| Example 17 | 300 | 50 | 20 | 30 | 5 |
| Example 18 | 300 | 100 | 50 | 90 | 3 |
| Example 19 | 500 | 150 | 100 | 180 | 3 |
| Example 20 | 500 | — | 300 | 500 | 1 |
| Example 21 | 2000 | — | 1000 | 2000 | 1 |
| Example 22 | 3000 | — | 2000 | 4000 | 1 |

From the results of FIG. 4, it was found that even in a case in which the maximum length (D) of the semiconductor particles was changed to 20 nm to 2,000 nm, selective absorption in a similar wavelength region can be realized.

In a case in which the maximum length was 100 nm or more, the proportion of reflection was increased. That is, it was found that it is possible to use the semiconductor particles as a selectively reflecting material, by increasing the maximum length of the semiconductor particles.

Furthermore, it is understood that in a case in which the maximum length was 2,000 nm, an absorptive and reflective structure like trailing the skirt toward the longer wavelength side is made more conspicuous. That is, it is understood that by setting the maximum length to 1,000 nm or more, the selectivity to particular wavelengths is further enhanced.

Example 23

10 mL of a toluene dispersion liquid of Sn-doped InP particles synthesized in Example 16 was mixed under stirring with 500 mg of TOPAS5013 (manufactured by Polyplastics Co., Ltd.), and thus a toluene dispersion liquid of particles having an olefin-based resin dissolved therein was prepared. The toluene dispersion liquid was dropped on a Si substrate, and the dispersion liquid was dried for about 2 hours in a vacuum dryer. Thereby, a polyolefin film having Sn-doped InP particles dispersed therein was produced. The optical characteristics of the film thus obtained were almost similar to those of the synthesized InP particle dispersion of Example 16, and the transmittance at the minimum transmission wavelength was approximately 0.45.

As described above, it was found that a film containing the semiconductor particles according to the present embodiment has optical characteristics almost similar to those of the semiconductor particles according to the present embodiment. Similarly, it is understood that the semiconductor particles according to the present embodiment can be used for a semiconductor particle optical filter, a building material, and a radiant cooling device.

The disclosure of Japanese Patent Application No. 2017-054587, filed on Mar. 22, 2017, is incorporated herein in its entirety by reference.

All publications, patent applications, and technical standards mentioned in this specification are herein incorporated by reference to the same extent as if each individual publication, patent application, or technical standard was specifically and individually indicated to be incorporated by reference.

EXPLANATION OF REFERENCES

12: medium
14: semiconductor particles

What is claimed is:

1. A semiconductor particle comprising at least one semiconductor selected from the group consisting of InP, InGaP, GaN, InGaN, InAs, InSb, and GaAs,
the semiconductor particle having a plasma frequency of $1.7 \times 10^{14}$ rad/s to $4.7 \times 10^{14}$ rad/s and a maximum length of 5 nm to 50 nm,
the semiconductor particle having a ligand on a surface thereof, and the ligand having 10 or more carbon atoms in a main chain.

2. The semiconductor particle according to claim 1, wherein the semiconductor particle has a plasma frequency of $1.9 \times 10^{14}$ rad/s to $3.0 \times 10^{14}$ rad/s.

3. The semiconductor particle according to claim 1, wherein the semiconductor particle comprises InP.

4. The semiconductor particle according to claim 1, wherein the semiconductor particle has a carrier concentration of $6.5 \times 10^{18}$ cm$^{-3}$ to $5 \times 10^{19}$ cm$^{-3}$.

5. The semiconductor particle according to claim 4, wherein the semiconductor particle has a carrier concentration of $8 \times 10^{18}$ cm$^{-3}$ to $2 \times 10^{19}$ cm$^{-3}$.

6. The semiconductor particle according to claim 1, further comprising a dopant.

7. The semiconductor particle according to claim 6, wherein the dopant comprises at least one selected from the group consisting of Sn, C, Si, S, Se, Te, Mg, and Zn.

8. The semiconductor particle according to claim 6, wherein the dopant is Sn.

9. The semiconductor particle according to claim 1, wherein the semiconductor particle has a shell layer.

10. The semiconductor particle according to claim 1, wherein the semiconductor particle has a minimum transmission wavelength in a wavelength range of 5 μm to 15 μm.

11. The semiconductor particle according to claim 1, wherein the semiconductor particle is used for forming a far-infrared absorbing material.

12. The semiconductor particle according to claim 1, wherein the semiconductor particle is used for forming a far-infrared reflecting material.

13. A dispersion comprising the semiconductor particle according to claim 1; and a medium.

14. A film comprising the semiconductor particle according to claim 1.

15. An optical filter comprising the semiconductor particle according to claim 1.

16. A building member comprising the semiconductor particle according to claim 1.

17. A radiant cooling device comprising the semiconductor particle according to claim 1.

* * * * *